Dec. 6, 1966   D. H. LOUNSBURY ETAL   3,289,610
CHOCOLATE SHAKER
Filed Aug. 10, 1964
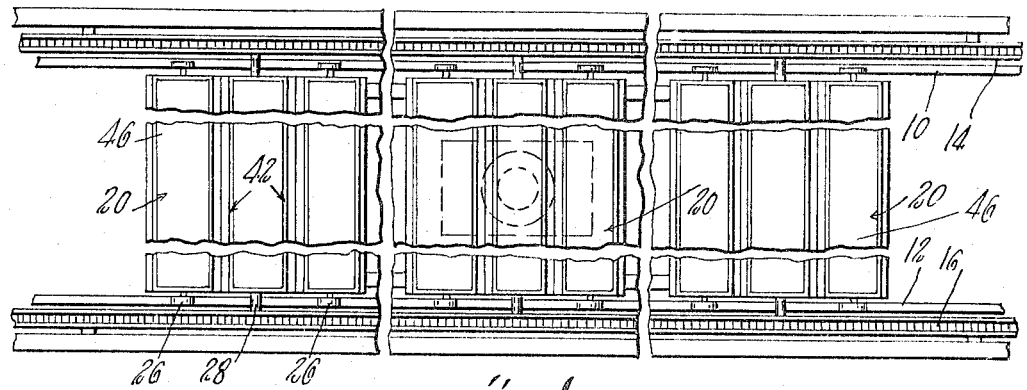
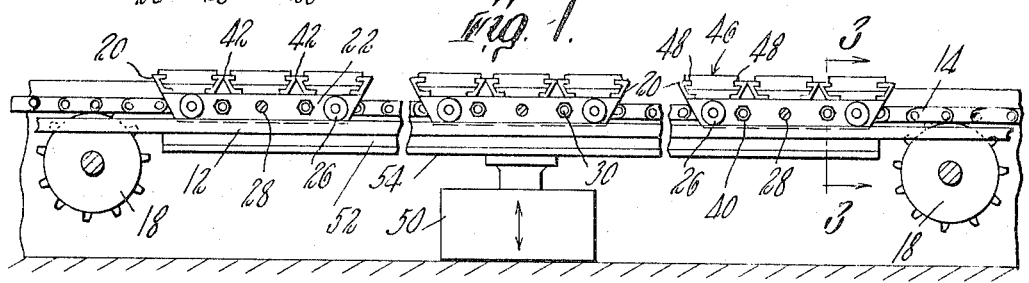
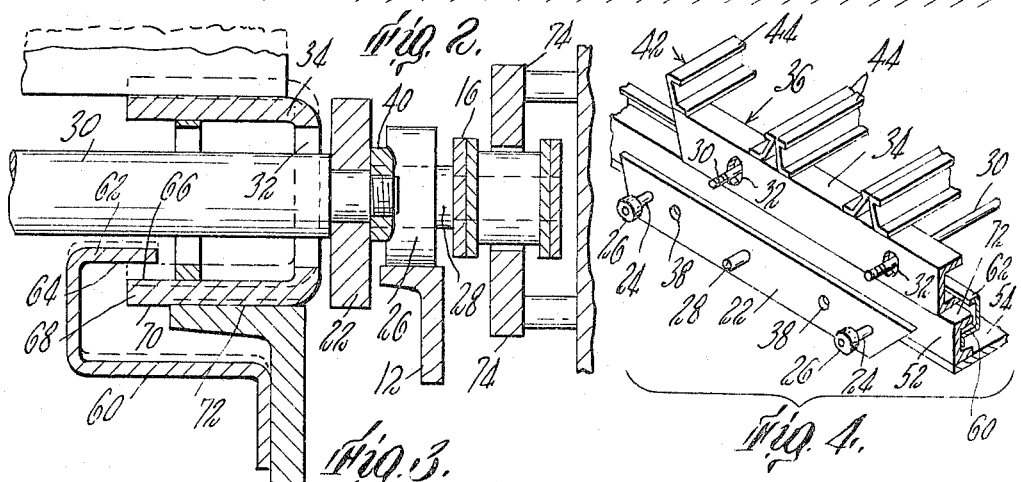
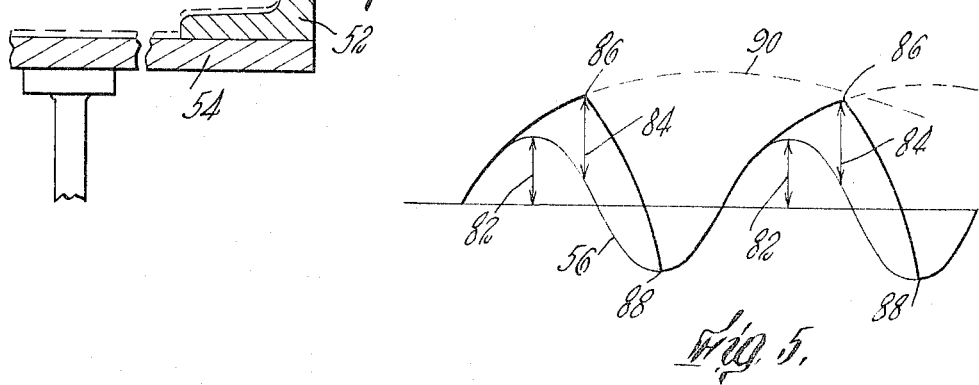

United States Patent Office 3,289,610
Patented Dec. 6, 1966

3,289,610
CHOCOLATE SHAKER
Donald H. Lounsbury, Reading, and James R. Cowdery, Andover, Mass., assignors to J. W. Greer Company, Wilmington, Mass., a corporation of Massachusetts
Filed Aug. 10, 1964, Ser. No. 388,632
13 Claims. (Cl. 107—8)

This invention relates to methods and apparatus for processing chocolate and like substances and more particularly to shaking methods and mechanisms adapted for use with the molding of chocolate.

After molten chocolate has been fed into molds, the chocolate is subjected to a vibrator cycle in an endeavor to release the bubbles from the mass. A high quality chocolate product is free of voids and has a glossy surface, which characteristics are not attained if the bubbles are not completely released. In addition, where printing is to appear on the surface of the molded chocolate, any voids that remain adjacent that surface would impair the quality of such printing. A number of devices have been used for vibrating chocolate to remove bubbles, but heretofore such devices either have not adequately removed the bubbles from the chocolate mass or they have required an inordinately long time to accomplish a minimally satisfactory degree of air bubble removal.

Accordingly, it is an object of this invention to provide novel methods and mechanisms which produce an improved chocolate product.

Another and more specific object of the invention is to provide a novel and improved shaker mechanism particularly adapted for the use of settling chocolate into molds.

A further object of the invention is to provide novel and improved shaker mechanisms for providing improved removal of air bubbles from chocolate.

In accordance with the invention there is provided a chocolate shaking mechanism which subjects chocolate filled molds to cyclical accelerations at a high repetition rate, which cyclical accelerations include alternate upward accelerating force and downward accelerating force greater than the force of gravity, the application of such forces being spaced so that the chocolate is subjected to the force of gravity alone for an interval between the applications of the upward and downward forces in each cycle. The chocolate is subjected to alternately upwardly directed and downwardly directed impacts with the result that the chocolate is settled into the molds more rapidly with corresponding rapid and substantially complete bubble removal.

The preferred embodiment of the invention is employed in a continuous processing system in which chocolate is deposited in molds as they move through a loading station on a continuously moving conveyor. The conveyor then moves the loaded molds onto a shaker which imparts this cycle of impacts and accelerating forces spaced by gravity action on the molds at a reption rate of about fifteen cyclers per second and an amplitude in the order of one-eighth of an inch. The carrier and mold trays are struck alternate upwardly and downwardly directed blows as the chocolate is vibrated. The downwardly directed blows in particular apparently contribute to the release of bubbles in a more rapid and more uniform manner than has been possible with prior art equipment of which we are aware. In addition, this apparatus increases the number of impacts to which the chocolate is subjected several fold without increasing the frequency of the shaker drive. Also, the tray vibration coupled to the tray transport is minimized. After the vibration, the molds continue into a cooler and the chocolate is solidified and then transferred to a removal station where the chocolate is removed from the hold trays. The resulting molded chocolate is an improved product having fewer air voids in it and having a glossier finish.

Other objects, features and advantages of the invention will be seen as the following description of a preferred embodiment progresses, in conjunction with the drawing, in which:

FIG. 1 is a top plan view in diagrammatic form of a conveyor and shaker structure constructed in accordance with the invention;

FIG. 2 is a side view in diagrammatic form of the apparatus in FIG. 1;

FIG. 3 is an enlarged sectional view taken along the line 3—3 of FIG. 2 of the mold carrier and shaker mounting;

FIG. 4 is a perspective view of portions of a mold carrier and shaker rail; and

FIG. 5 is a diagrammatic view indicating the path of movement of the shaker and molds in accordance with the invention.

FIG. 1 is a top view and FIG. 2 is a side view, both in diagrammatic form, of a shaker structure and conveyor employed in a chocolate processing system. The illustrated system is a part of a continuous system for processing chocolate from the deposit of molten chocolate in a mold through a shaking operation to settle the chocolate in the mold and remove all the air bubbles from the chocolate and a cooling operation where the chocolate is solidified to the removal of the solidified chocolate from the mold and the return of the mold for refilling. Only the shaking portion of this cycle is shown, but the conveyor structure extends throughout the entire system. This conveyor includes two rails 10, 12 and a pair of chains 14, 16 which are driven by suitable means, such as wheels 18, which may be either driven wheels or idler wheels. Several mold carriers, generally indicated at 20, may be moved along the conveyor system simultaneously.

Each mold carrier, as indicated in FIGS. 1, 2, and 4, includes two support plates 22, each of which carries a pair of stub shafts 24 on which rollers 26 are mounted. Each pair of rollers mounted on a plate 22 is supported on a corresponding rail 12 for movement therealong. Also extending from each plate 22 is a third stub shaft 28 which is longer than the other two stub shafts 24 and on which is secured the chain 14 or 16 by which the carrier is driven. The two side plates 22 are secured on transverse rods 30 which extend through slots 32 in the vertical members of the C-shaped side channels 34 of the mold carrier 36 and through circular holes 38 in plates 22 for securing with nuts 40 (FIG. 3). Mounted on these side channels are pairs of C-shaped mold support members 42. Each pair of C-shaped members 42 have their flanges 44 facing each other and the molds 46 have slotted edges 48 (FIG. 2) which fit into the upper flanges 44 of the support members 42 to secure the molds on the carrier.

The shaker itself may be powered by any suitable means, indicated diagrammatically at 50, and in the preferred embodiment an Ajax-Schaler vibrator unit employing eccentric weights is used. The amplitude of the vibrator drive motion is about one-eighth inch, and a preferred frequency for milk chocolate is 910 cycles per minute. The vibrator 50 is mechanically connected to two parallel C-shaped rail members 52 through a suitable coupling member such as plate 54 so that the pair of rail members 52 is reciprocated in a uniform motion, for example a sinusoidal motion along a path 56, as indicated in FIG. 5. Secured to each rail member 52 is a bracket 60 (FIG. 3) which has an inturned flange portion 62 that provides a downwardly facing surface 64, a portion of which overlies the upwardly facing surface 66 of the lower flange 68 of the carrier side channel 34 when that channel is positioned on the shaker rail 52. The flange 68 also has a downwardly facing surface 70 which may contact the upper or support surface 72 of the shaker rail 52. In this embodiment surface 64 is spaced one-eighth inch from surface 66 when surfaces 70 and 72 are in contact. (Chain guards 74, as indicated in FIG. 3, are provided as a safety feature.)

In operation the molds 46 and the carriers 36 are moved by the conveyor chains 14, 16 along rails 10, 12 supported by rollers 26 through the coaction of bars 30 with the vertical walls of the slots 32.

An amplitude of shaker vibration of one-eighth inch and a frequency of 910 cycles per minute (approximately fifteen cycles per second) have been found to produce the desired rapid air removal from the chocolate in a mold carrier of a forty-eight pound loaded weight. (These parameters are set forth as illustrative as other parameters may be employed such as a range of frequencies of five-thirty cycles per second.) The mass of the carrier as a function of the shaker drive is such that the carrier is sufficiently accelerated during each cycle to lift off the shaker rail 52 and continue to move away from the shaker rail 52, during which period the carrier is exposed solely to the force of gravity, until its surface 66 strikes flange stop surface 64. This contact of the carrier 36 with flange 62 effects a sharp reversal of direction, producing a substantial upwardly directed force on the chocolate which overcomes surface tension forces and frees air located adjacent the surface thereof in a bubble releasing operation.

The approximate path of travel of the mold carrier is indicated in FIG. 5 (line 80) in which the shaker follows path 56 (a sinusoidal curve of amplitude 82). In each cycle the mold carrier lifts off the shaker rail 52 and when the carrier is spaced from the shaker the distance 84 (equal to the spacing between surfaces 64 and 66 when the apparatus is at rest), surfaces 64 and 66 contact each other, and as the shaker is being driven downward, the carrier direction is abruptly changed at point 86, subjecting the chocolate to a sharp impact force. The carrier then moves downward rapidly under the combined influence of the shaker and gravity until its surface 70 contacts the rail surface 72 at point 88 where it is subjected to a sharp reversal of direction and corresponding impact force and then moves upwardly under the driving force of the shaker. ( The path of the carrier if not subjected to alternate, oppositely directed impacts is indicated by dashed line 90.) This high frequency low amplitude vibration of the chocolate, combined with alternate oppositely directed impacts, produces a quality chocolate more rapidly than other types of commercial apparatus presently available.

While a preferred embodiment of the invention has been shown and described, it will be obvious to those of ordinary skill in the art that various modifications may be made therein and therefore it is not intended that the invention be limited to the disclosed embodiment or to details thereof, and departures may be made therefrom within the spirit and scope of the invention as defined in the claims.

What is claimed is:

1. Apparatus for processing chocolate comprising a member having an upwardly facing support surface,
   chocolate mold carrying means adapted to be supported on said member in a manner permitting at least limited freedom of generally vertical movement of said chocolate mold carrying means,
   said chocolate mold carrying means including a downwardly facing surface and an upwardly facing surface spaced apart a predetermined distance,
   downwardly facing stop surface means carried by said member positioned above said support surface a distance greater than said predetermined distance, and
   means to vibrate said member at a rate such that said upwardly facing and downwardly facing surfaces of said chocolate mold carrying means alternately strike said downwardly facing stop surface means and said support surface, respectively.

2. The apparatus as claimed in claim 1 wherein said member is vibrated at a rate between five and thirty cycles per second.

3. The apparatus as claimed in claim 1 wherein said vibrating rate is about fifteen cycles per second.

4. The apparatus as claimed in claim 1 wherein the amplitude of vibration of said member is less than one inch.

5. The apparatus as claimed in claim 1 wherein the amplitude of said member is in the order of one-eighth inch.

6. The apparatus as claimed in claim 1 and further including means to move said chocolate mold carrying means along said member and in a direction generally parallel to the surface thereof in a continuous manner while said member is being vibrated.

7. Apparatus for processing chocolate comprising a member having an upwardly facing support surface,
   chocolate mold carrying means adapted to be supported on said member,
   means for advancing said chocolate mold carrying means along said member in a generally horizontal direction while permitting at least limited freedom of generally vertical movement of said chocolate mold carrying means,
   said chocolate mold carrying means including a downwardly facing surface and an upwardly facing surface spaced apart a predetermined distance,
   downwardly facing stop surface means carried by said member positioned above said support surface a distance greater than said predetermined distance, and
   means to vibrate said member at a rate such that said upwardly facing and downwardly facing surfaces of said chocolate mold carrying means alternately strike said downwardly facing surface stop means and said support surface, respectively.

8. Apparatus for shaking chocolate comprising a member having an upwardly facing support surface and a downwardly facing stop surface spaced above said support surface,
   a mold carrier having a first surface adapted to rest on said member support surface and an upwardly facing second surface in alignment with but spaced from the downwardly facing stop surface of said member when said first surface is resting on the support surface of said member,
   means to secure a mold adapted to hold chocolate therein on said carrier,
   rail means for supporting said mold carrier for movement across said member,
   said carrier having a pair of transversely spaced, wall members,
   a generally vertically extending slot in each said wall member,
   a drive member extending through said slot,
   said carrier including support means connected to said drive member and including bearing members adapted to engage said rail means,
   means to drive said mold carrier along said rail means, and
   means to vibrate said member at a frequency in the order of fifteen cycles per second and at an amplitude of one-eighth inch to apply a series of impacts in alternate opposite directions to the chocolate in a mold secured on said carrier, which impacts are effective to release air bubbles from the chocolate in the mold.

9. Apparatus for shaking chocolate comprising a member having an upwardly facing support surface and a downwardly facing stop surface, a chocolate mold carrier having a base adapted to rest on said member support surface and an upwardly facing auxiliary surface in alignment with but spaced from the stop surface of said member when said base is resting on the support surface of said member, means for supporting said carrier for movement across said member, said carrier including vertically disposed drive surface means, means engaging said vertically disposed drive surface means to move said carrier along said carrier support means, and means to vibrate said member at a rate so that said base and auxiliary surface of said chocolate mold carrier alternately strike said support surface and said stop surface, respectively, to apply a series of impacts in alternate opposite directions to the chocolate on said carrier, which impacts are effective to release air bubbles from the chocolate.

10. The apparatus as claimed in claim 9 wherein said member vibrating means operates at a rate between five and thirty cycles per second.

11. The apparatus as claimed in claim 9 wherein said member vibrating means operates at a rate of about fifteen cycles per second.

12. The apparatus as claimed in claim 9 wherein said amplitude of vibration of said member vibrating means is less than one inch.

13. The apparatus as claimed in claim 9 wherein the amplitude of vibration of said member vibrating means is in the order of one-eighth inch.

References Cited by the Examiner
UNITED STATES PATENTS

| | | | |
|---|---|---|---|
| 1,079,563 | 11/1913 | Knight | 107—8.95 |
| 2,397,695 | 4/1946 | Schutt | 259—72 |

WALTER A. SCHEEL, *Primary Examiner.*

J. SHEA, *Assistant Examiner.*